(12) United States Patent
Tewinkle

(10) Patent No.: US 7,656,448 B2
(45) Date of Patent: Feb. 2, 2010

(54) SYSTEM FOR SELECTING A FORMAT FOR CONTROL DATA IN AN IMAGING DEVICE

(75) Inventor: Scott L. Tewinkle, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 578 days.

(21) Appl. No.: 11/158,643

(22) Filed: Jun. 22, 2005

(65) Prior Publication Data

US 2006/0291009 A1    Dec. 28, 2006

(51) Int. Cl.
*H04N 3/14* (2006.01)
*H04N 5/335* (2006.01)

(52) U.S. Cl. ..................................... 348/302
(58) Field of Classification Search ................. 348/294, 348/296, 302, 308, 312; 250/208.1; 257/291, 257/292; 358/482; 327/172
See application file for complete search history.

(56) References Cited

U.S. PATENT DOCUMENTS

| | | | |
|---|---|---|---|
| 4,691,237 A | 9/1987 | Shimizu | |
| 4,714,963 A | 12/1987 | Vogel | |
| 5,148,168 A | 9/1992 | Masuda et al. | |
| 5,519,514 A | 5/1996 | TeWinkle | |
| 5,838,373 A | 11/1998 | Hasegawa et al. | |
| 6,028,630 A * | 2/2000 | Fukui et al. | 348/312 |
| 6,133,563 A * | 10/2000 | Clark et al. | 250/208.1 |
| 6,344,906 B1 * | 2/2002 | Gatto et al. | 358/474 |
| 6,507,365 B1 * | 1/2003 | Inoue et al. | 348/296 |
| 6,771,309 B1 * | 8/2004 | Ide et al. | 348/211.99 |
| 7,283,169 B2 * | 10/2007 | Tanaka | 348/312 |
| 2003/0090582 A1 * | 5/2003 | Shimokawa | 348/297 |
| 2003/0128286 A1 * | 7/2003 | Kubota et al. | 348/296 |
| 2003/0227656 A1 * | 12/2003 | TeWinkle | 358/482 |
| 2004/0095497 A1 | 5/2004 | Compton et al. | |

* cited by examiner

Primary Examiner—Jason Whipkey
(74) Attorney, Agent, or Firm—Simpson & Simpson, PLLC

(57) ABSTRACT

An imaging apparatus, such as used in a digital camera or scanner, includes at least one photosensor chip. The chip includes subsystems thereon that control the integration periods of the photosensors according to different control data formats. A selector is used to adapt the chip to accept control data of a selected format consistent with a larger apparatus or system.

4 Claims, 4 Drawing Sheets

SYSTEM FOR SELECTING A FORMAT FOR CONTROL DATA IN AN IMAGING DEVICE

CROSS-REFERENCE TO RELATED APPLICATION

Cross-reference is hereby made to the following co-pending U.S. patent application, assigned to the Assignee hereof, titled "System for Controlling Image Data Readout in an Imaging Device," U.S. Ser. No. 11/143,245, filed Jun. 2, 2005, now Publication No. 20060274175, published Dec. 7, 2006.

INCORPORATION BY REFERENCE

The following U.S. patents are hereby incorporated by reference in their entireties: U.S. Pat. Nos. 5,148,168 and 5,519,514.

TECHNICAL FIELD

The present disclosure relates to image scanning arrays, as in a digital copier or digital camera.

BACKGROUND

Image sensor arrays typically comprise a linear array of photosensors which raster scan an image-bearing document and convert the microscopic image areas viewed by each photosensor to video image signals. Following an integration period, the image signal charges formed on the photosensors are amplified and transferred as analog video signals to a common output line or bus through successively actuated multiplexing transistors.

For high-performance image sensor arrays, one embodiment includes an array of photosensors of a width comparable to the width of a page being scanned, to permit imaging generally without the use of reductive optics. In order to provide such a "full-width" array, however, relatively large silicon structures must be used to define the large number of photosensors. In one design, an array is made of twenty silicon chips, butted end-to-end, each chip having 248 active photosensors spaced at 400 photosensors per inch. Typically, the chips which are butted to form the array are formed in a silicon wafer, which is then "diced" into a number of chips, which are individually tested and then arranged into a bar shape.

The present disclosure relates to a chip configuration that can be readily adapted for use in a larger system or apparatus, taking into account a given format of control data by which the larger system controls the chips.

SUMMARY

According to one aspect, there is provided an imaging apparatus, comprising at least one controllable subset of photosensors. A first subsystem operates the subset of photosensors according to a first control data format, and second subsystem for operating the subset of photosensors according to a second control data format.

According to another aspect, there is provided an imaging apparatus comprising at least a first subset of photosensors. A first subsystem operates the first subset of photosensors according to a first control data format, the first control data format including a signal being in a predetermined state for substantially a duration of a desired integration period for the subset of photosensors. A second subsystem operates the first subset of photosensors according to a second control data format, the second control data format including a signal causing the beginning or ending of an integration period of the subset of photosensors. A selector selects one of the first control data format and the second control data format.

DETAILED DESCRIPTION

Figure 1:
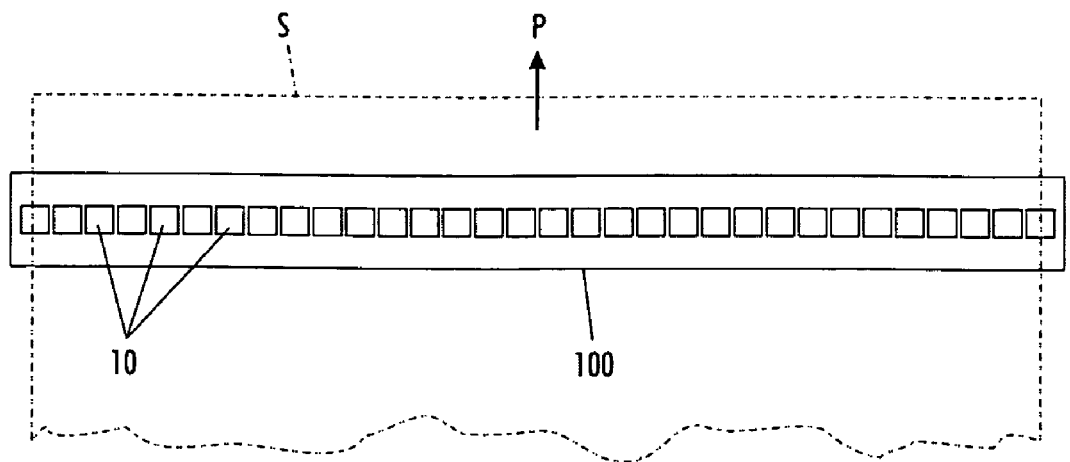
FIG. 1 is a plan view of a portion of a "full-width-array" input scanner as would be used in office equipment such as a digital copier.

FIG. 1 is a plan view of a portion of a "full-width-array" input scanner as would be used in office equipment such as a digital copier. A set of photosensor chips, each indicated as 10, is arranged on a circuit board 100. Each chip 10 includes a set of photosensors, as will be described below. Together, the chips 10 on board 100 form one or more linear arrays of photosensors that extend a length comparable to the width of an image-bearing sheet such as S effectively moving in a process direction P. The sheet S can move relative to the board 100 by being placed on a platen (not shown) relative to which the board 100 moves; or the sheet S can be fed through a document handler (not shown). As the sheet S moves past board 100, a series of small areas on the sheet S reflect light (from a source, not shown) into photosensors on the chips 10. The chips 10 receive the reflected light from sheet S and output image signals for subsequent recording and processing.

Figure 2:
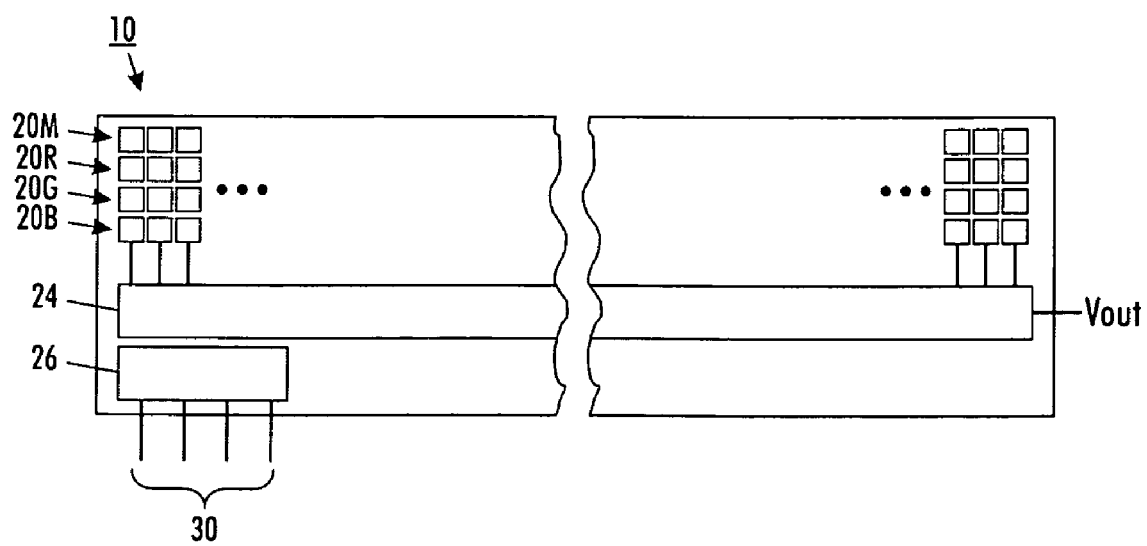
FIG. 2 is a plan view of a photosensor chip in isolation.

FIG. 2 shows a photosensor chip 10 in isolation. In this embodiment, each chip 10 includes four linear arrays, or rows, of photosensors, labeled 20M (for monochrome, or white), 20R (for red), 20G (for green) and 20B (for blue). Each array is provided with a translucent filter (not shown) that causes the array to be sensitive to a particular color or range of wavelength. The monochrome array 20M is sensitive to light throughout the visible spectrum, and is useful when scanning images for monochrome-only image data, as would be useful, for example, in a monochrome copier or facsimile machine, or for optical character scanning. The photosensors may also be provided with other types of filters, such as for infrared blocking.

In the present embodiment, for each "column" (as shown in the Figure) of one photosensor of each type 20M, 20R, 20G, 20B, there is one output line to an output shift register 24. A general description of how multiple photosensors in a column send signals over one line to a shift register is given in U.S. Pat. No. 5,148,168 mentioned above. It will be evident that each photosensor of each type 20M, 20R, 20G, 20B in a column will "look at" one small area of an image being recorded, to obtain full color image data about the small area. A description of how the action of multiple photosensors of different colors must be coordinated is given in U.S. Pat. No. 5,519,514 mentioned above. Once a "scanline" of digital image signals is loaded into shift register 24, the image data for that scanline is output from the chip 10, such as through line $V_{OUT}$.

When reading out video signals from various subsets of photosensors, each photosensor in a subset undergoes different changes in its "integration state." Briefly, with any of various basic arrangements of photosensor design, when a predetermined charge or potential level is placed on a photosensor, the photosensor enters an "integration period," in which any light falling on the photosensor is used to accumulate a charge on the photosensor. To end the integration period, another predetermined potential is placed on the photosensor. Following the integration period, the accumulated charge, which relates generally to the intensity of light having fallen on the photosensor during the integration period, is transferred off the photosensor in a known manner. As used herein, "changing the integration state" of a photosensor includes any instance in which a potential or charge is placed on or is associated with a photosensor, to begin or end an integration period.

Figure 3:
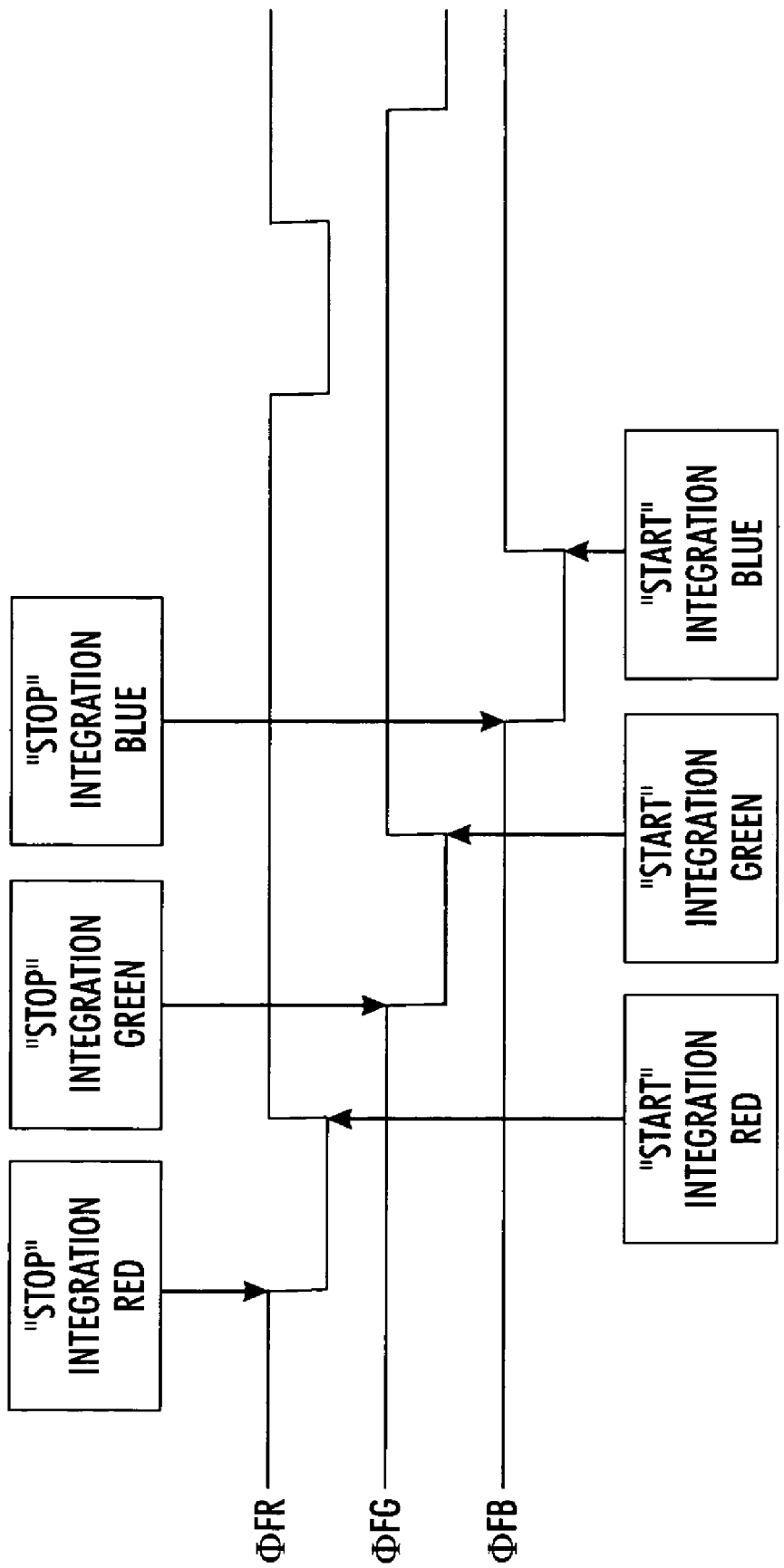
FIG. 3 is a simplified timing diagram showing a typical operation of a chip for one cycle of operation according one type of control data format.
Figure 4:
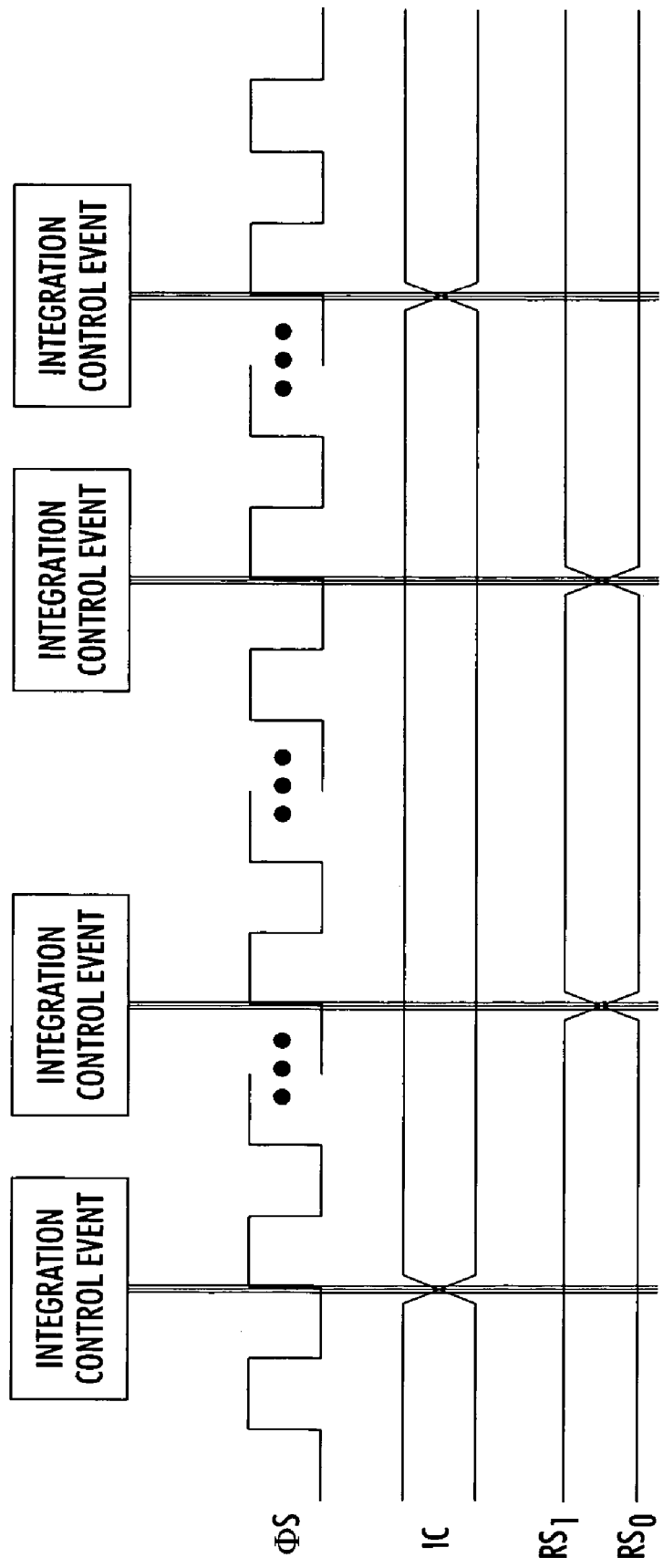
FIG. 4 is a simplified timing diagram showing a typical operation of a chip for one cycle of operation according to another type of control data format.

As can be seen in FIG. 2, the controller 26 (which need not be a discrete portion of the chip 10, as shown in the embodiment, but rather may reflect capabilities that reside in various places on or off chip 10) accepts a set of control lines, generally indicated as 30, each carrying a specific type of signal, from a control system off the chip. In order to control the integration period of a selected subset of photosensors on the chip as it records a series of scanlines, the control data entering on lines 30 must be in a predetermined format. FIGS. 3 and 4 are comparative, simplified diagrams of typical control data formats for operating subsets of photosensors on a chip over the recording of one or more scanlines.

One possible type of format for controlling the photosensors is characterized by a signal entering the chip, the signal being in a predetermined state for substantially a duration of a desired integration period for a selected subset of photosensors. For instance, in FIG. 3, there is a simplified diagram of how signals $\phi FR$, $\phi FG$, $\phi FB$ (entered on one or more lines such as 30) control the integration times of the individual rows of photosensors. The overall operation is described in more detail in, for example, U.S. Pat. No. 5,519,514 mentioned above. In the Figure, the integration period for the red row 20R corresponds to the relevant signal $\phi FR$ being high on a line 30: when $\phi FR$ is high, the red row of photosensors 20R undergoes its integration period (in effect, "the shutter is open"), and when $\phi FR$ is low, integration is not occurring (in effect, "the shutter is closed"). The same principle applies, as can be seen, to other rows and corresponding signals (the operation of the monochrome row 20M is typically optional depending on a desired scanning operation).

Another possible format for controlling the photosensors includes a signal (such as, but not limited to, a pulse, or a change in state) causing the beginning or ending of the integration period of a subset of photosensors. As an example, which can be seen in the diagram of FIG. 4, a chip accepts an integration control signal IC on one of the control lines such as 30. The integration control signal IC causes the photosensors in a selected row or other subset to have a change in integration state. When a subset of photosensors such as row 30R receives an IC signal, the photosensors simply change their integration state from whatever the state happens to be at the time: the salient feature is that the IC signal changes the integration state of a subset of photosensors, as opposed to defining the duration of the integration state, as with the above-described method.

Also in the method illustrated in FIG. 4, the row select signals RS1 and RS0, which can be loaded through other lines 30, represent a two-bit parallel code identifying the subset to change in integration state in response to the next IC signal. The two-bit parallel lines can thus select, over time, one of the four rows of photosensors 20M, 20R, 20G, 20B in the chip of FIG. 2, to have its integration state changed with the next IC signal. The pixel clock $\phi_S$ is typically a constantly-running square wave of a predetermined frequency. The method of FIG. 4 is described in more detail in the co-pending application referenced above.

When chips 10 are installed in a larger apparatus such as 100 in FIG. 1, the larger system (such as a digital scanner or digital copier) may use one or another type of control data format to control the operation of the chips 10. It is desirable to provide chips 10 of a design that enables control with either control data format, so one basic chip design can be installed in machines with either type of control data format.

Figure 5:
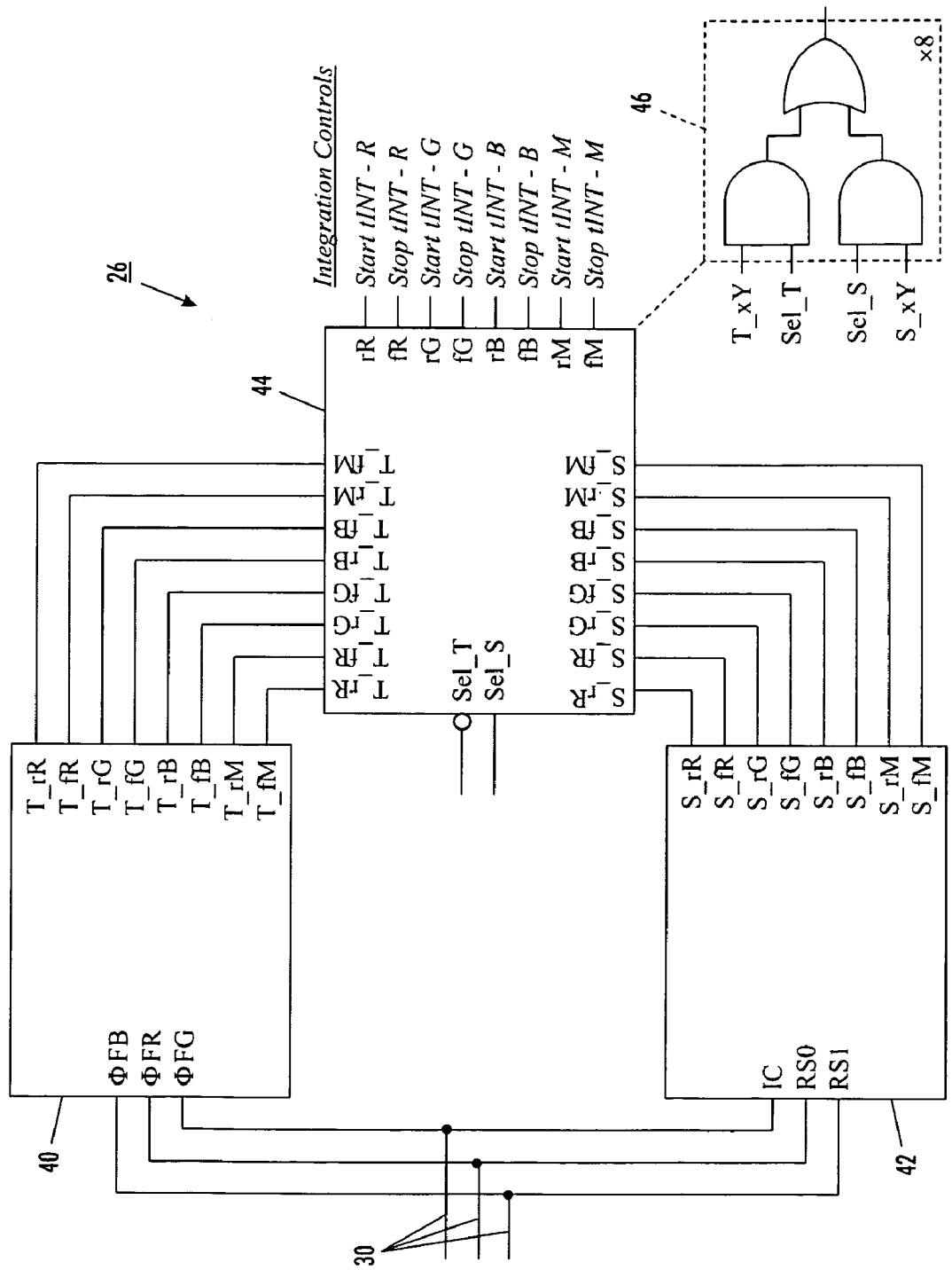
FIG. 5 is a simplified block diagram of a control system of a photosensor chip, by which the control data format to operate the chip can be selected.

FIG. 5 is a simplified block diagram of a system within a control system 26 of a chip 10 by which the control data format to operate the chip can be selected. The input lines 30 onto chip 10 branch off to both a "duration" based integration control subsystem 40 and a "change integration state" based integration control subsystem 42: as such, the inputs into subsystem 40 are $\phi FR$, $\phi FG$, $\phi FB$ as seen in FIG. 3, and the inputs into subsystem 42 are IC, RS0, and RS1 as seen in FIG. 4. Regardless of which type of control signals are used in the larger apparatus, these control signals are entered on input lines 30 and, depending on the type, are sent to one or the other subsystem 40 or 42. As used herein, the term "subsystem" shall mean any signal-processing entity, incorporating hardware and/or software, which processes the incoming control signals; and may or may not include, or go beyond, elements in the illustrated embodiment.

The subsystems 40 and 42 each accept incoming control signals of a given type and, in the present embodiment, in turn output control data for starting and stopping the integration periods in the various subsets of photosensors 20M, 20R, 20G, 20B, as can be seen by the output labels in FIG. 5. The conversions of data within each subsystem 40, 42 may be carried out in hardware or software. The converted data from either subsystem 40 or 42 is then multiplexed in a multiplexer 44. The output of multiplexer 44 is signals that directly affect the integration states of the photosensors in each subset. Another input to multiplexer 44 is one or more selection lines, here indicated as Sel_T and Sel_S. These selection lines tell the multiplexer 44 which input (from either subsystem 40 or 42) to use in its output. Sample gating arrangement 46, seen in FIG. 5, is representative of the interaction of the various signals for each combination xY of inputs to multiplexer 44. The aspects of the multiplexer 44 responsive to selection lines Sel_T and Sel_S can be considered a example of a "selector" for selecting which type of control data format will be processed by chip 10.

In a practical operation, chips 10 of a single basic design, particularly including the elements shown in FIG. 5, are installed on a board 100 (as shown in FIG. 1) that is disposed within a larger apparatus such as a scanner or digital copier. The larger apparatus will use one control data format, either "duration" based or "change integration state" based. By setting the control lines Sel_T and Sel_S of each chip 10, typically (but not necessarily) at the time of construction of the larger apparatus, one can adapt the chips to accept the control data format of the larger apparatus. Chips 10 can thus be installed in a larger system or apparatus using either type of control data format.

Although FIG. 5 shows a common set of input lines 30 going into subsystems 40 and 42, an alternate design could provide two separate sets of input lines, one set for each subsystem 40 and 42; in such an arrangement one subsystem could in effect be "selected" by the larger apparatus being connected only to the lines of the subsystem suitable for the apparatus' control data format.

Although the present embodiment is directed toward controlling the integration times of different-filtered linear rows of photosensors, the principle can be applied to controlling any kind of subsets of photosensors in an apparatus, such as in a two-dimensional photosensor array as would be found in a digital camera. The different, effectively independently-controllable subsets could be related by color (such as to alter the color balance or other output of the apparatus); or by sub-area within a the linear or two-dimensional array (in case only a portion of the array is desired to be used at a particular time). Photosensors of different selectable subsets could be commingled with each other within the array, such as to enable "low resolution" operation; i.e., in low resolution only an evenly-distributed subset of photosensors in the array would be read out. The overall system can also facilitate an array wherein one subset of photosensors are effectively provided with a longer integration or exposure time than another commingled subset: such an arrangement may be useful in improving the exposure latitude of a digital camera, such as to allow taking a long-exposure picture and a short-exposure picture simultaneously.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. An imaging apparatus comprising:
   at least a first subset of photosensors,
   a first subsystem for operating the first subset of photosensors according to a first control data format, the first control data format including a signal being in a predetermined state for substantially a duration of a desired integration period for the subset of photosensors, said signal causing an integration period of the subset of photosensors;
   a second subsystem for operating the first subset of photosensors according to a second control data format, the second control data format including a signal causing the beginning or ending of an integration period of the subset of photosensors; and
   a selector for selecting one of the first control data format and the second control data format.

2. The apparatus of claim 1, the first subset of photosensors being substantially sensitive to a first color, and further comprising a second subset of photosensors being substantially sensitive to a second color.

3. The apparatus of claim 1, further comprising
   a plurality of chips, each chip including one controllable subset of photosensors.

4. The apparatus of claim 1, wherein said signal of the second control data format is a pulse signal.

* * * * *